(12) United States Patent
Tai et al.

(10) Patent No.: US 10,473,963 B2
(45) Date of Patent: Nov. 12, 2019

(54) TOUCH DISPLAY APPARATUS WITH ANTI-PEEPING TECHNOLOGY

(71) Applicant: AU OPTRONICS CORPORATION, Hsin-chu (TW)

(72) Inventors: Cheng-An Tai, Hsin-chu (TW); Yu-Feng Chien, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 148 days.

(21) Appl. No.: 15/595,469

(22) Filed: May 15, 2017

(65) Prior Publication Data

US 2017/0336665 A1   Nov. 23, 2017

(30) Foreign Application Priority Data

May 20, 2016   (TW) .............................. 105115700 A

(51) Int. Cl.
| | |
|---|---|
| *G06F 3/045* | (2006.01) |
| *G02F 1/1333* | (2006.01) |
| *G02F 1/13* | (2006.01) |
| *G06F 3/041* | (2006.01) |
| *G06F 3/044* | (2006.01) |
| *G06F 21/84* | (2013.01) |

(52) U.S. Cl.
CPC ........ *G02F 1/13338* (2013.01); *G02F 1/1323* (2013.01); *G06F 3/044* (2013.01); *G06F 3/0412* (2013.01); *G06F 21/84* (2013.01)

(58) Field of Classification Search
CPC ... G02F 1/13338; G02F 1/1323; G06F 3/0412

USPC .......................................................... 345/174
See application file for complete search history.

(56) References Cited

U.S. PATENT DOCUMENTS 9,164,306 B2   10/2015   Lee
2009/0109202 A1*   4/2009   Kitagawa .......... G02F 1/134363
                                                                345/206

(Continued)

FOREIGN PATENT DOCUMENTS

| CN | 102331896 A | 1/2012 |
| CN | 102841466 A | 12/2012 |
| CN | 103034377 A | 4/2013 |

*Primary Examiner* — Jonathan M Blancha
(74) *Attorney, Agent, or Firm* — Tim Tingkang Xia, Esq.; Locke Lord LLP

(57) ABSTRACT

A touch display apparatus includes a first substrate including first and second surfaces, a second substrate having a side facing the second surface and provided with a pixel electrode layer, an insulator layer and a common electrode layer, and a liquid crystal (LC) layer disposed between the first and second substrates. The second surface is provided with opening areas, a non-opening area surrounding the opening areas, a black matrix layer, a color filter layer, a protection layer, a touch electrode layer, first and second flat layers, and a patterned viewing angle control transparent electrode layer including control electrode members disposed corresponding to the opening areas, first connection electrode members disposed corresponding to the non-opening area in a first direction and connected to the control electrode members, and second connection electrode members disposed corresponding to the non-opening area in a second direction and connected to the first connection electrode members.

10 Claims, 12 Drawing Sheets

(56) References Cited

U.S. PATENT DOCUMENTS

| | | | |
|---|---|---|---|
| 2014/0168138 A1* | 6/2014 | Kuo | G06F 3/0412 345/174 |
| 2016/0291790 A1* | 10/2016 | Yao | G06F 3/0418 |
| 2016/0349889 A1 | 12/2016 | Yang et al. | |

* cited by examiner

TOUCH DISPLAY APPARATUS WITH ANTI-PEEPING TECHNOLOGY

CROSS-REFERENCE TO RELATED PATENT APPLICATION

This application claims the benefit of priority under 35 U.S.C. § 119(a) to Taiwan Patent Application No. 105115700, filed in Taiwan, R.O.C. on May 20, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates to a display apparatus, and more particularly to a touch display apparatus.

BACKGROUND

With the development of panel technologies, at present, many commercially available displays or mobile apparatuses have a touch function. Generally speaking, at present, touch panels are mainly implemented by using an on-cell technology, an out-cell technology or an in-cell technology. As the name implies, for touch panels using the on-cell technology and the out-cell technology, a touch element is integrated outside a panel. For a touch panel using the in-cell technology, in a stage of panel engineering, a touch element fabricated together in the panel, and therefore, as compared with the touch panels using the on-cell technology and the out-cell technology, the touch panel using the in-cell technology has advantages of being lightweight and thin; however, the in-cell technology involves relatively high difficulty. Therefore, at present, many technical persons are doing related research.

In addition, as mobile apparatuses become popular, users use smart phones or tablet computers much more often in public places. However, in crowded places (for example, on a crowded bus or on in a metro train), it is very difficult to prevent others from seeing information on a screen when a mobile apparatus is used to read personal messages, and in this case, in consideration of privacy, a touch apparatus having an anti-peeping function is certainly needed. At present, an adhesion-type anti-peeping patch is commercially available. Although the anti-peeping patch is adhered on a surface of a screen of the mobile apparatus to achieve an anti-peeping effect, display brightness of the screen is greatly reduced, and viewing experience is still reduced even if nobody is around peeping.

SUMMARY

The present disclosure provides a touch display apparatus. The touch display apparatus is integrated with an anti-peeping technology to achieve light weight and small thickness as well as relatively desirable display quality.

The present disclosure proposes a touch display apparatus, which includes a first substrate and a second substrate disposed opposite to each other and a liquid crystal (LC) layer disposed between the first substrate and the second substrate. The first substrate has a first surface and a second surface. A plurality of opening areas and one non-opening area surrounding the opening areas are provided on the second surface of the first substrate, and a black matrix layer, a color filter layer, a protection layer, a touch electrode layer, a first flat layer, a patterned viewing angle control transparent electrode layer, and a second flat layer are further provided on the second surface of the first substrate. The patterned viewing angle control transparent electrode layer is disposed on the first flat layer and has a plurality of control electrode members, a plurality of first connection electrode members, and a plurality of second connection electrode members. The control electrode members are disposed corresponding to the opening areas. The first connection electrode members are disposed corresponding to the non-opening area and extending in a first direction setting and are electrically connected to the control electrode members. The second connection electrode members are disposed corresponding to the non-opening area and extending in a second direction and are electrically connected to the first connection electrode members. The second substrate has a side adjacent to the second surface of the first substrate, and includes a pixel electrode layer, an insulator layer, and a common electrode layer that are disposed on the side. The insulator layer is disposed between the pixel electrode layer and the common electrode layer.

In the present disclosure, a patterned viewing angle control transparent electrode layer is integrally disposed inside a touch display apparatus. A location of the patterned viewing angle control transparent electrode layer disposed corresponding to the touch display apparatus and thickness of a flat layer are adjusted to achieve relatively desirable LC efficiency. Therefore, when a voltage is applied on the patterned viewing angle control transparent electrode layer, rotation of LC can be controlled to achieve efficacy of anti-peeping.

BRIEF DESCRIPTION OF THE DRAWINGS

The disclosure will become more fully understood from the detailed description given herein below for illustration only, and thus are not limitative of the disclosure.

DETAILED DESCRIPTION

Figure 1:
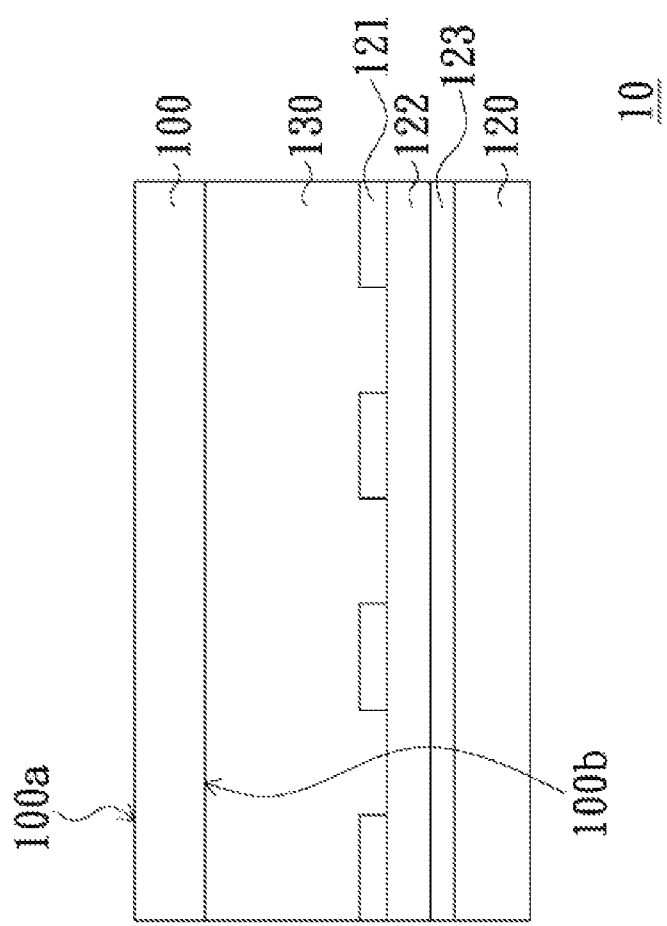
FIG. 1 is a schematic view of a touch display apparatus according to the present disclosure.

FIG. 1 is a schematic view of a touch display apparatus according to the present disclosure. A touch display apparatus 10 includes a first substrate 100, a second substrate 120 disposed opposite to the first substrate 100, and an LC layer 130 sandwiched between the first substrate 100 and the second substrate 120. A pixel electrode layer 121, an insulator layer 122, and a common electrode layer 123 are disposed on a side, facing a second surface 100b of the first substrate 100, of the second substrate 120. The insulator layer 122 is disposed between the pixel electrode layer 121 and the common electrode layer 123. In this embodiment, the common electrode layer 123 is disposed on the second substrate 120 and the pixel electrode layer 121 is disposed on the insulator layer 122. Alternatively, the pixel electrode layer 121 is disposed on the second substrate 120 and the common electrode layer 123 is disposed on the insulator layer 122; however, the present disclosure is not limited thereto. For description of a detailed structure of the first substrate 100, refer to subsequent drawings and description.

Figure 2A:
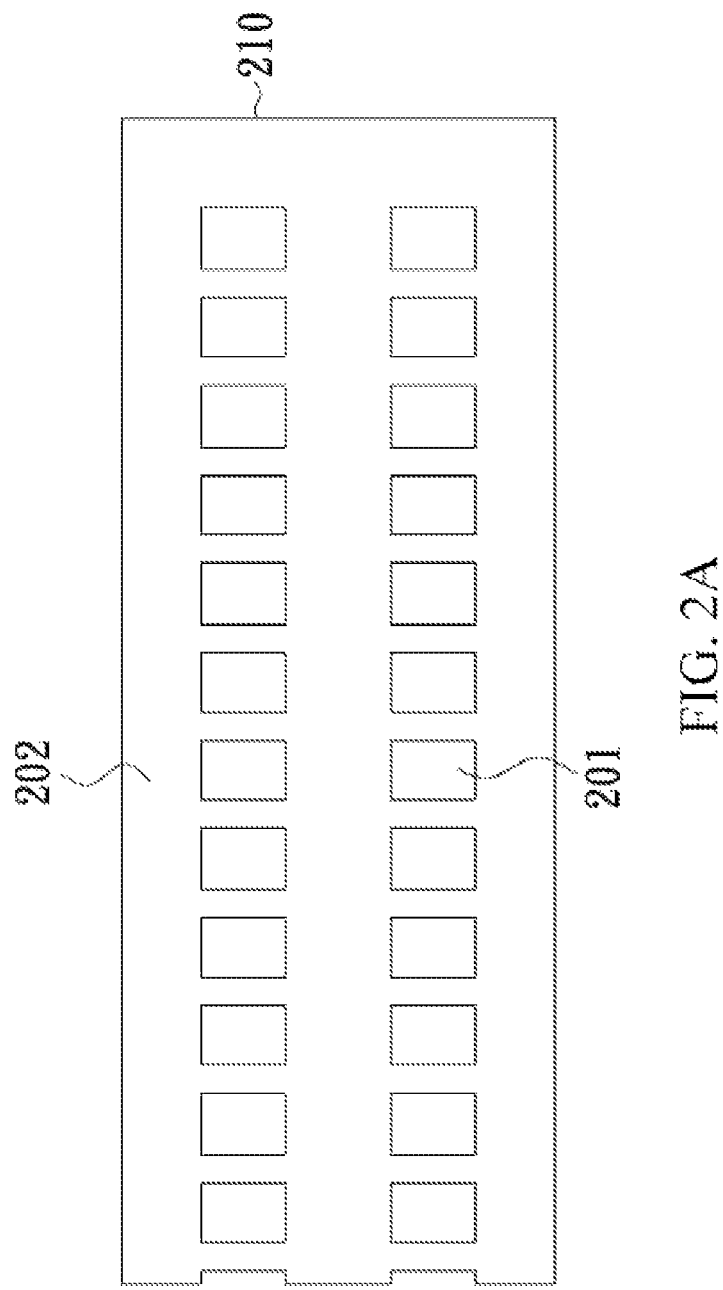
FIG. 2A is a top view of a black matrix layer according to an embodiment of the present disclosure.
Figure 2B:
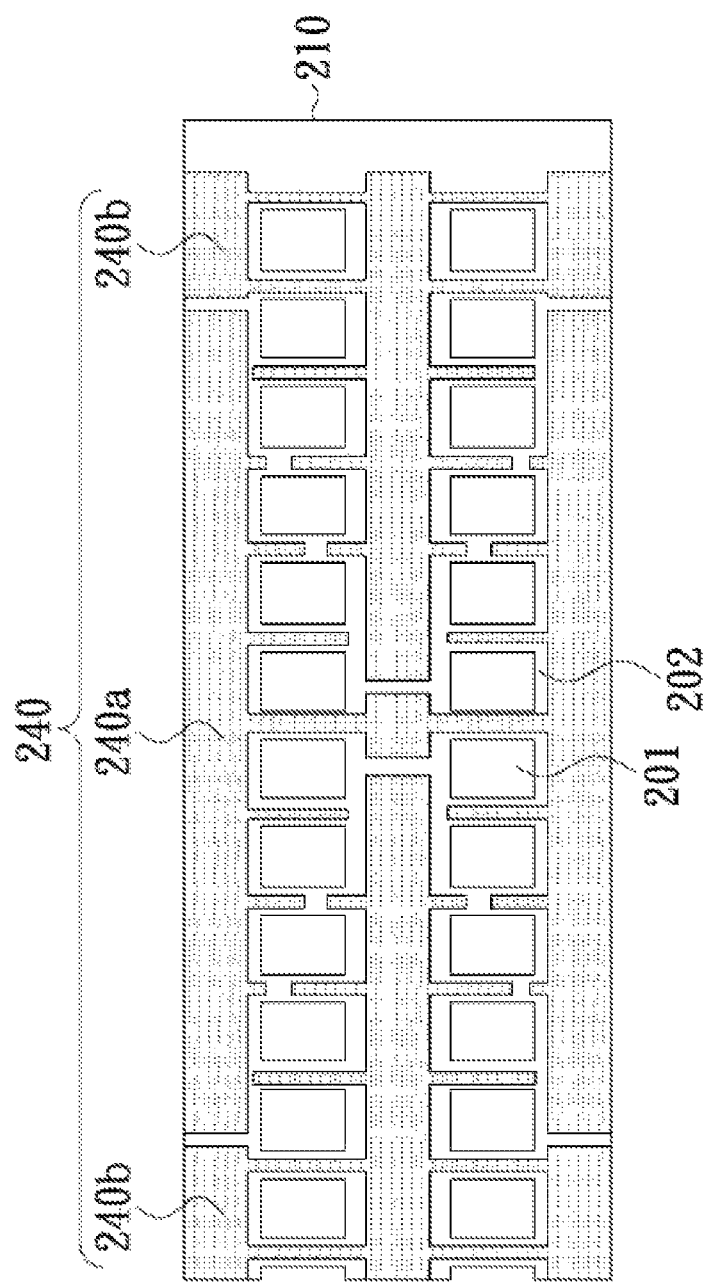
FIG. 2B is a top view of a touch electrode layer disposed on the black matrix layer according to the present disclosure.
Figure 2C:
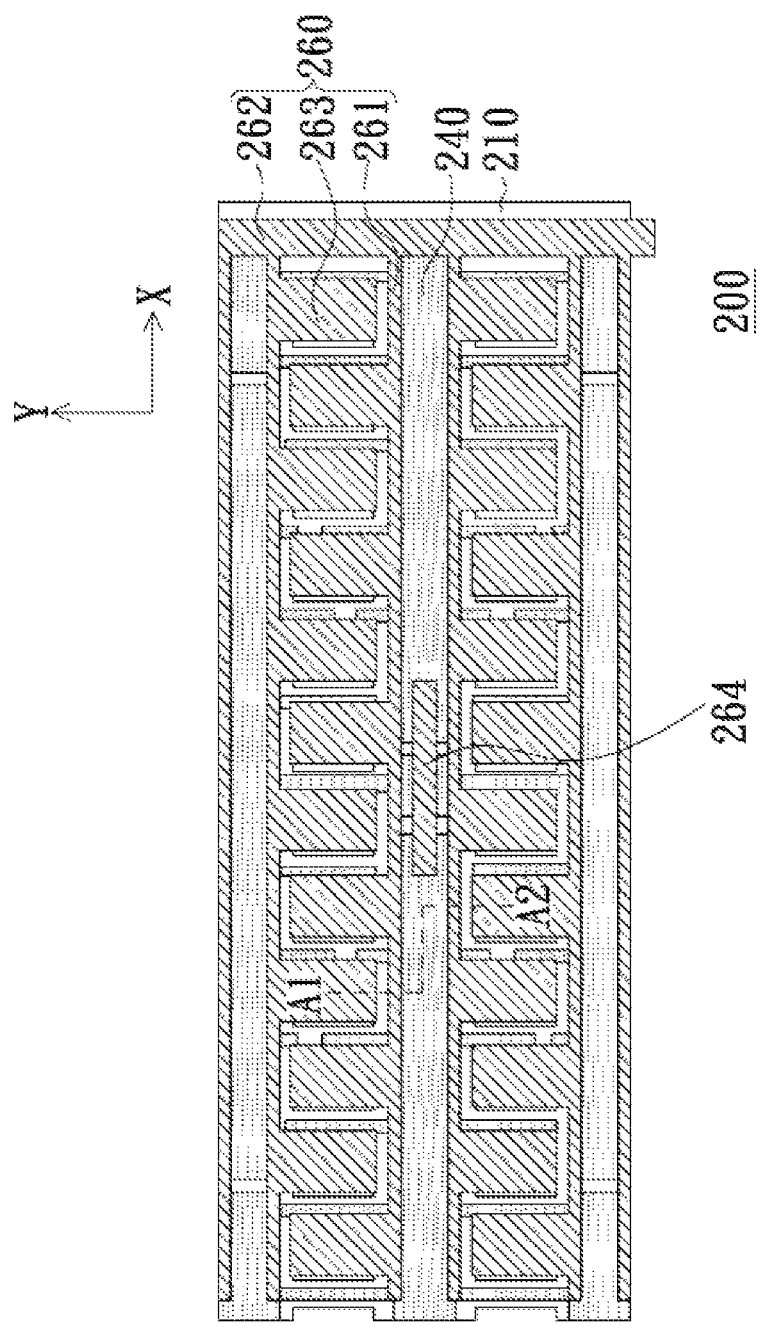
FIG. 2C is a top view of a first substrate according to an embodiment of the present disclosure.
Figure 3A:
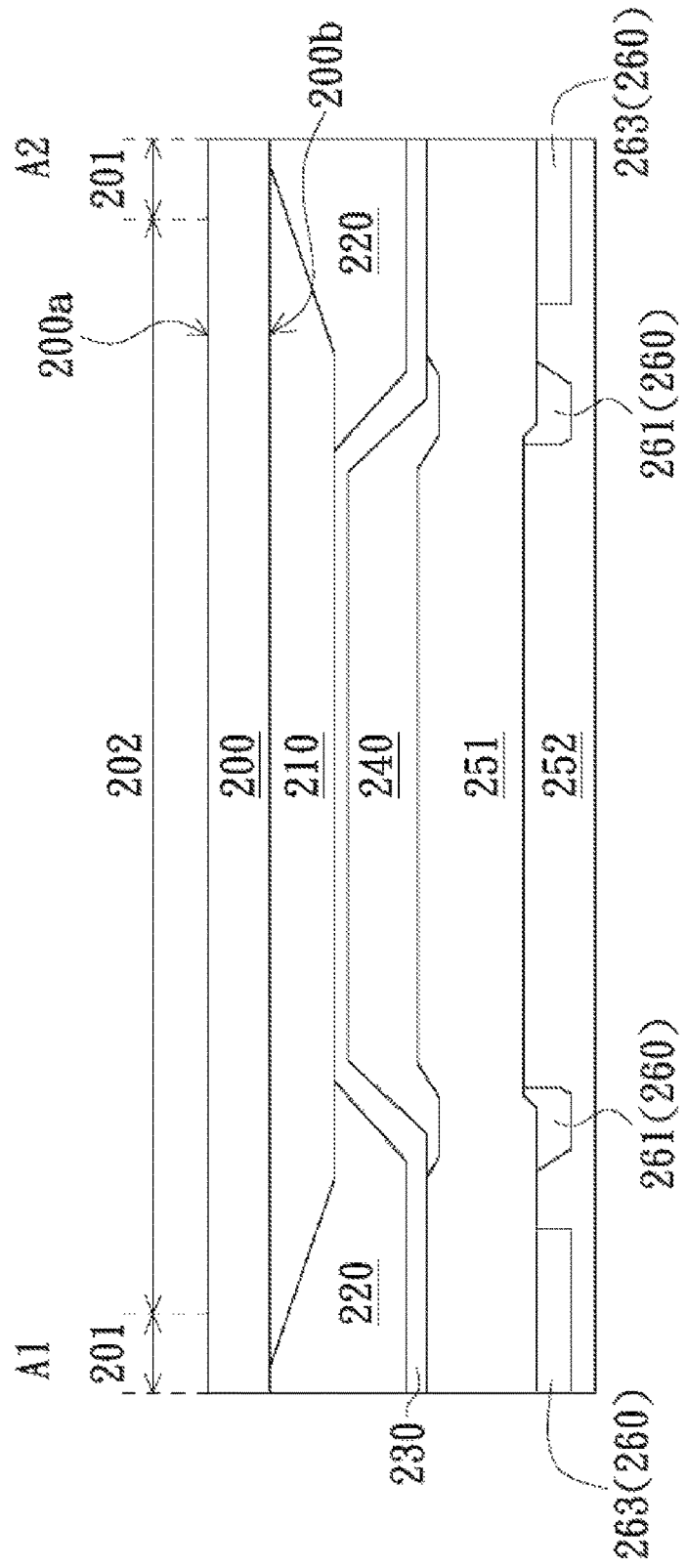
FIG. 3A is a schematic sectional view of the first substrate along a sectional line A1-A2 in FIG. 2C according to an embodiment of the present disclosure.

FIG. 2A is a top view of a black matrix layer according to an embodiment of the present disclosure. FIG. 2B is a top view of a touch electrode layer disposed on the black matrix layer according to the present disclosure. FIG. 2C is a top view of a first substrate of an embodiment of the present disclosure. FIG. 3A is a schematic sectional view of the first substrate along a sectional line A1-A2 in FIG. 2C according to an embodiment of the present disclosure. Referring to both FIG. 2A and FIG. 3A, the first substrate 200 has a first surface 200a and a second surface 200b. A plurality of opening areas 201 and a non-opening area 202 are defined on the second surface 200b of the first substrate 200, and the non-opening area 202 surrounds the plurality of opening areas 201. The black matrix layer 210 is disposed on the second surface 200b of the first substrate 200, where the black matrix layer 210 is disposed corresponding to the non-opening area 202 to surround the plurality of opening areas 201. Next, as shown in FIG. 3A, a color filter layer 220 is disposed on the second surface 200b of the first substrate 200 corresponding to the opening areas 201, and is partially located at an edge, adjacent to the opening areas 201, of the black matrix layer 210; however, the present disclosure is not limited thereto. Specifically, the color filter layer 220 in this embodiment may include a red filter layer, a green filter layer, and a blue filter layer (not shown). The red filter layer, the green filter layer, and the blue filter layer are respectively disposed corresponding to the opening areas 201 of the first substrate 200 respectively by using an island type. Edges of the red filter layer, the green filter layer, and the blue filter layer are partially overlapped with the edge of the black matrix layer 210 respectively. Subsequently, a protection layer 230 is disposed on the black matrix layer 210 and the color filter layer 220. A material of the protection layer 230 may be an organic insulation material, an inorganic insulation material or a combination of the foregoing materials. Next, referring to FIG. 2B, FIG. 2C, and FIG. 3A together, the touch electrode layer 240 is disposed on the protection layer 230 corresponding to the non-opening area 202. A material of the touch electrode layer 240 may be indium tin oxide (ITO), indium zinc oxide (IZO), metal or another suitable transparent conductive material. In this embodiment, the touch electrode layer 240 includes a plurality of first touch electrodes 240a and a plurality of second touch electrodes 240b. The plurality of first touch electrodes 240a may be sensing touch electrodes and the plurality of second touch electrodes 240b may be driving touch electrodes; alternatively, the plurality of first touch electrodes 240a may be driving touch electrodes and the plurality of second touch electrodes 240b may be sensing touch electrodes. In addition, this embodiment may also further include disposing another touch conductive layer (not shown) on the touch electrode layer 240; however, the present disclosure is not limited thereto. A person skilled in the art may consider a value of a touch capacitance during design to decide whether to dispose another touch conductive layer. In certain embodiments, the touch electrode layer 240 may be formed of metal covered with ITO or IZO. With the composite structure, the capacitance may be adjusted. Next, as shown in FIG. 3A, a first flat layer 251 is disposed on the touch electrode layer 240 and the protection layer 230. In this embodiment, the color filter layer 220 using an island-type design may save a cost of the color filter layer, and for an uneven thickness of the color filter layer 220, a problem of uneven film thickness may be mitigated by fabricating the touch electrode layer 240 and the first flat layer 251 subsequently. However, the present disclosure is not limited thereto, and a person skilled in the art may adjust, according to a design consideration, a manner of fabricating the color filter layer. Subsequently, referring to both FIG. 2C and FIG. 3A, a patterned viewing angle control transparent electrode layer 260 is disposed on the first flat layer 251. A material of the patterned viewing angle control transparent electrode layer 260 may be indium tin oxide (ITO), indium zinc oxide (IZO) or another suitable transparent conductive material. In this embodiment, the patterned viewing angle control transparent electrode layer 260 has a plurality of control electrode members 263, a plurality of first connection electrode members 261, and a plurality of second connection electrode members 262. The control electrode members 263 are disposed corresponding to the opening areas 201. The first connection electrode members 261 are disposed corresponding to the non-opening area 202 and extending in a first direction X and are electrically connected to the plurality of control electrode members 263. The second connection electrode members 262 are disposed corresponding to the non-opening area 202 and extending in a second direction Y and are electrically connected to the plurality of first connection electrode members 261. The first direction X and the second direction Y are directions intersecting with each other. The patterned viewing angle control transparent electrode layer 260 further includes a plurality of transparent bridging lines 264. The transparent bridging lines 264 are electrically insulated from the control electrode members 263, the first connection electrode members 261, and the second connection electrode members 262. The transparent bridging lines 264 are disposed between any adjacent two of the first connection electrode members 261 and are electrically connected to any adjacent two of the second touch electrodes 240b of the touch electrode layer 240. Finally, referring to FIG. 3A, a second flat layer 252 is disposed on the patterned viewing angle control transparent electrode layer 260 and the first flat layer 251. A thickness of the second flat layer 252 is at least 3 micrometers, so as to present relatively desirable LC efficiency.

For the first substrate 200 according to the embodiment of the present disclosure, in the present disclosure, the touch electrode layer 240 and the patterned viewing angle control transparent electrode layer 260 are both integrated on the first substrate 200, and the patterned viewing angle control transparent electrode layer 260 is used to fabricate the transparent bridging lines 264, the control electrode members 263, the first connection electrode members 261, and the second connection electrode members 262 together to remove a procedure. In this example, the transparent bridging lines 264 are used to transfer a signal between the second touch electrodes 240b, and the control electrode members 263, the first connection electrode members 261, and the second connection electrode members 262 are used to transfer a signal of a common electrode layer 123 of a second substrate 120.

Referring to both FIG. 1 and FIG. 3A, when a voltage difference is applied between the common electrode layer 123 and the pixel electrode layer 121, the LC layer 130 may be controlled to generate a different grayscale. When a voltage difference is applied between the patterned viewing angle control transparent electrode layer 260 and the common electrode layer 123, the LC layer 130 may be further controlled to reduce a viewing angle of the touch display apparatus 10 to enter an anti-peeping mode. When there is no voltage difference between the patterned viewing angle control transparent electrode layer 260 and the common electrode layer 123, the viewing angle of the touch display apparatus 10 is kept normal to stay in a normal mode. In this example, when a gap between the patterned viewing angle control transparent electrode layer 260 and the LC layer 130 is at least 3 micrometers, relatively desirable LC efficiency can be kept, that is, the thickness of the second flat layer 252 is at least 3 micrometers.

Figure 3B:
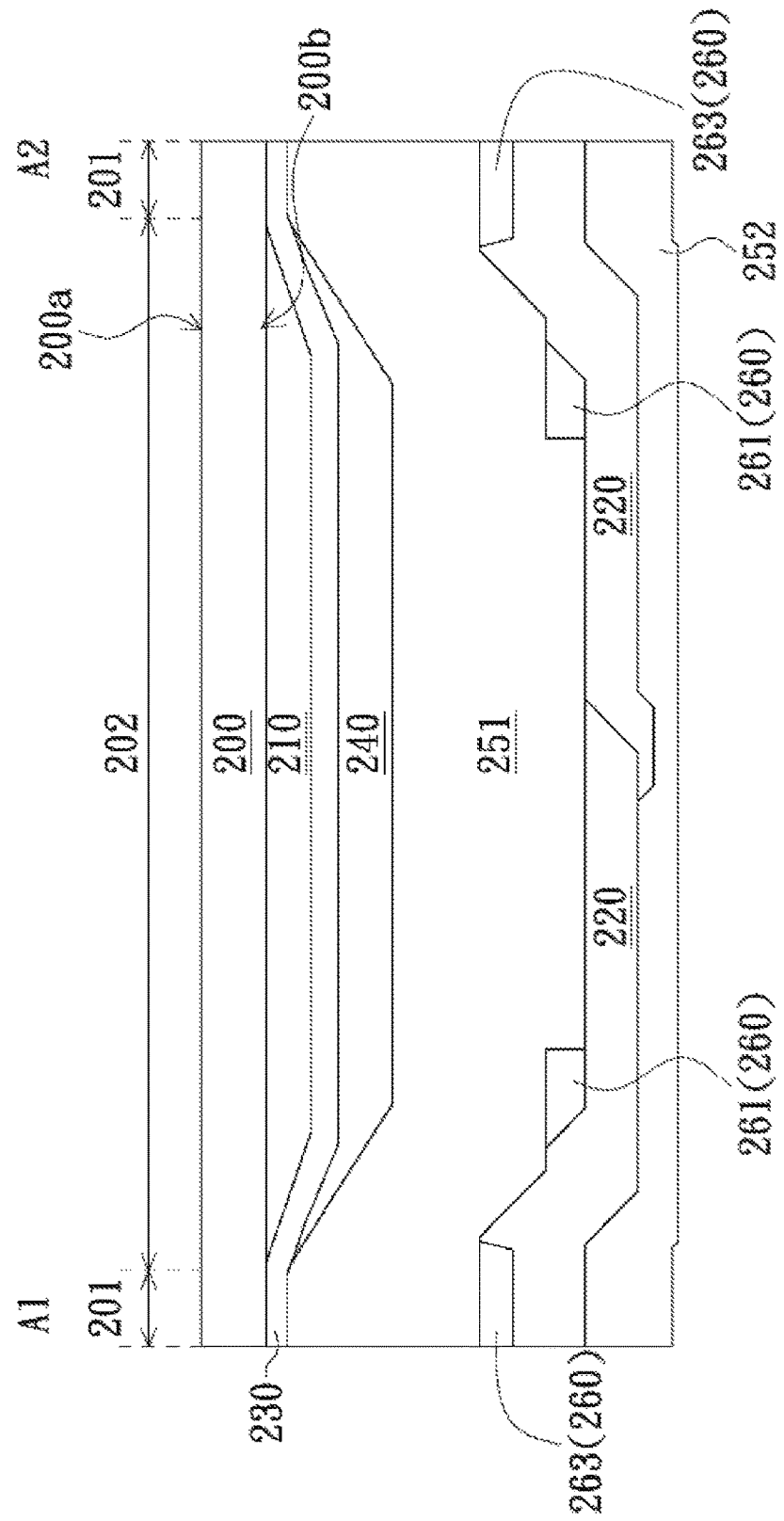
FIG. 3B is a schematic sectional view of the first substrate along a sectional line A1-A2 in FIG. 2C according to a variant embodiment of the present disclosure.

FIG. 3B is a schematic sectional view of the first substrate along a sectional line A1-A2 in a variant embodiment of the present disclosure. FIG. 3B is a variant embodiment of FIG. 3A, and same element symbols and detailed description are not elaborated herein. Only corresponding differences are described below. As shown in FIG. 3B, the color filter layer 220 is disposed on the patterned viewing angle control transparent electrode layer 260 and the first flat layer 251 corresponding to the opening areas 201 and the non-opening area 202; however, the present disclosure is not limited thereto. Specifically, the color filter layer 220 in this embodiment may include a red filter layer, a green filter layer, and a blue filter layer (not shown). The red filter layer, the green filter layer, and the blue filter layer are respectively disposed by using a strip type respectively in parallel in the first direction X or the second direction Y (refer to FIG. 2C). Edges of the red filter layer, the green filter layer, and the blue filter layer are partially overlapped with each other respectively in a direction of a vertical projection of the black matrix layer 210. Next, the second flat layer 252 is disposed on the color filter layer 220. In this embodiment, a total thickness of the color filter layer 220 and the second flat layer 252 is at least 3 micrometers to keep relatively desirable LC efficiency. In this embodiment, the color filter layer 220 uses a strip design, so that flatness of a film layer may be improved, to prevent that a subsequent thickness of the second flat layer 252 is insufficient to affect flatness of the second flat layer 252. However, the present disclosure is not limited thereto, and a person skilled in the art may adjust, according to a design consideration, a manner of fabricating the color filter layer. In the variant embodiment of the present disclosure, the color filter layer 220 is disposed between the patterned viewing angle control transparent electrode layer 260 and the second flat layer 252, so as to reduce the thickness of the second flat layer 252 to reduce vapor infiltration to avoid formation of LC bubbles.

Figure 4A:
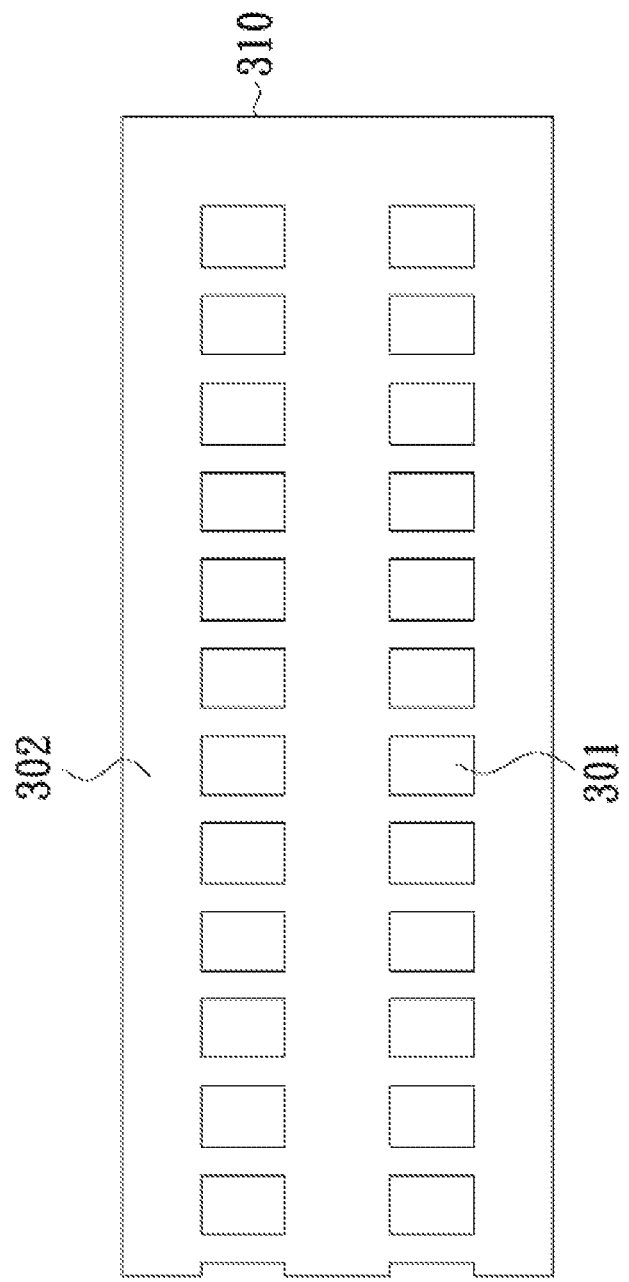
FIG. 4A is a top view of a black matrix layer according to another embodiment of the present disclosure.
Figure 4B:
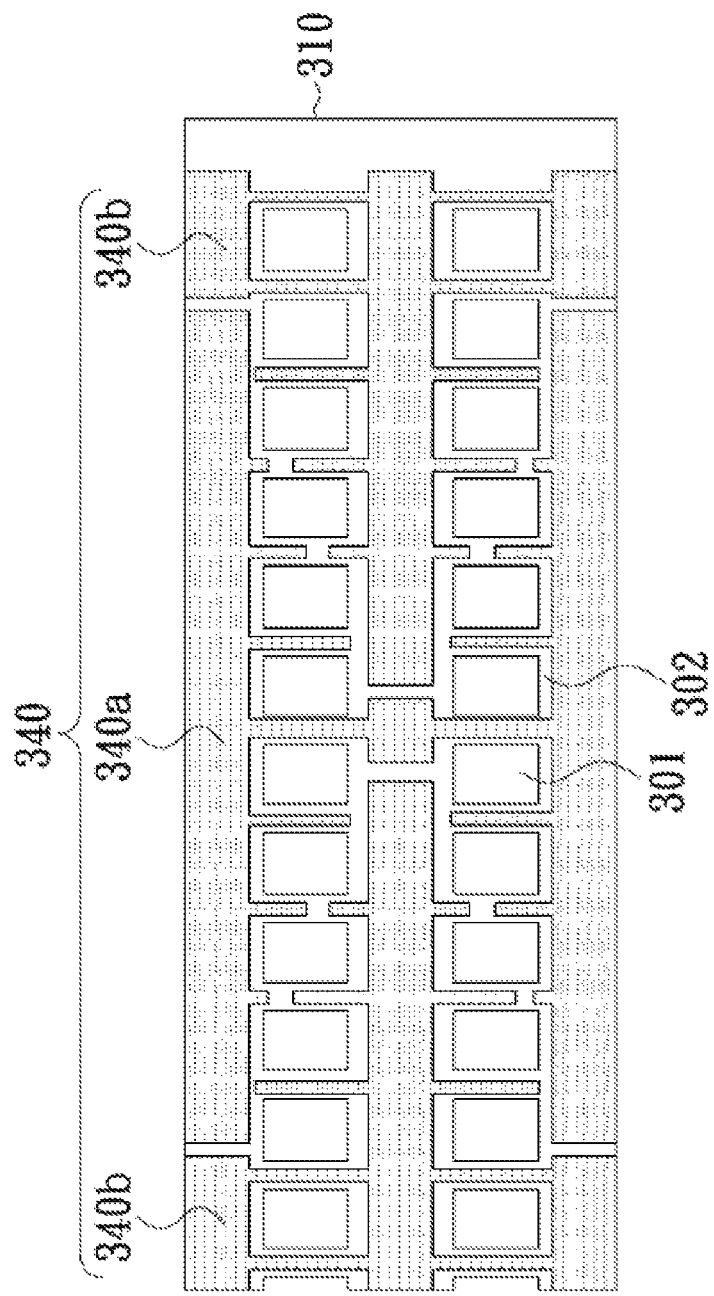
FIG. 4B is a top view of a touch electrode layer disposed on the black matrix layer according to another embodiment of the present disclosure.
Figure 4C:
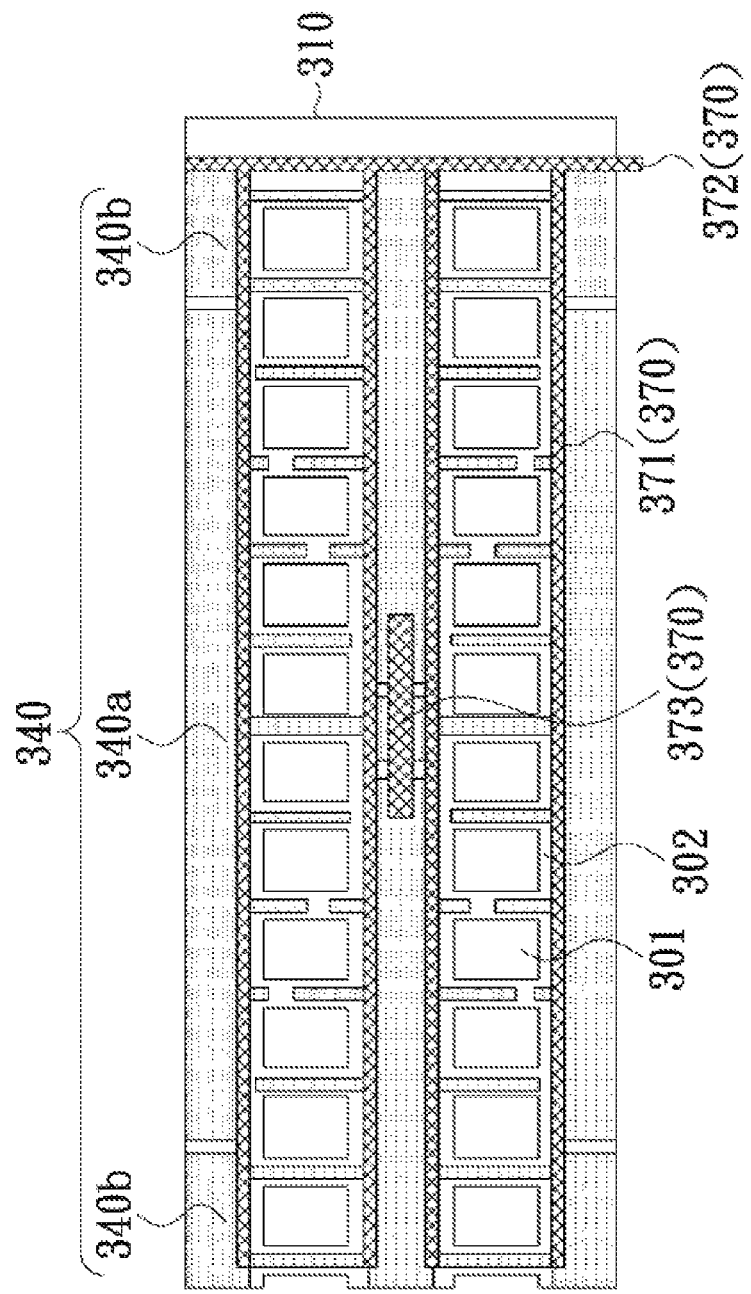
FIG. 4C is a top view of a metal layer disposed on the touch electrode layer and the black matrix layer according to an embodiment of the present disclosure.
Figure 4D:
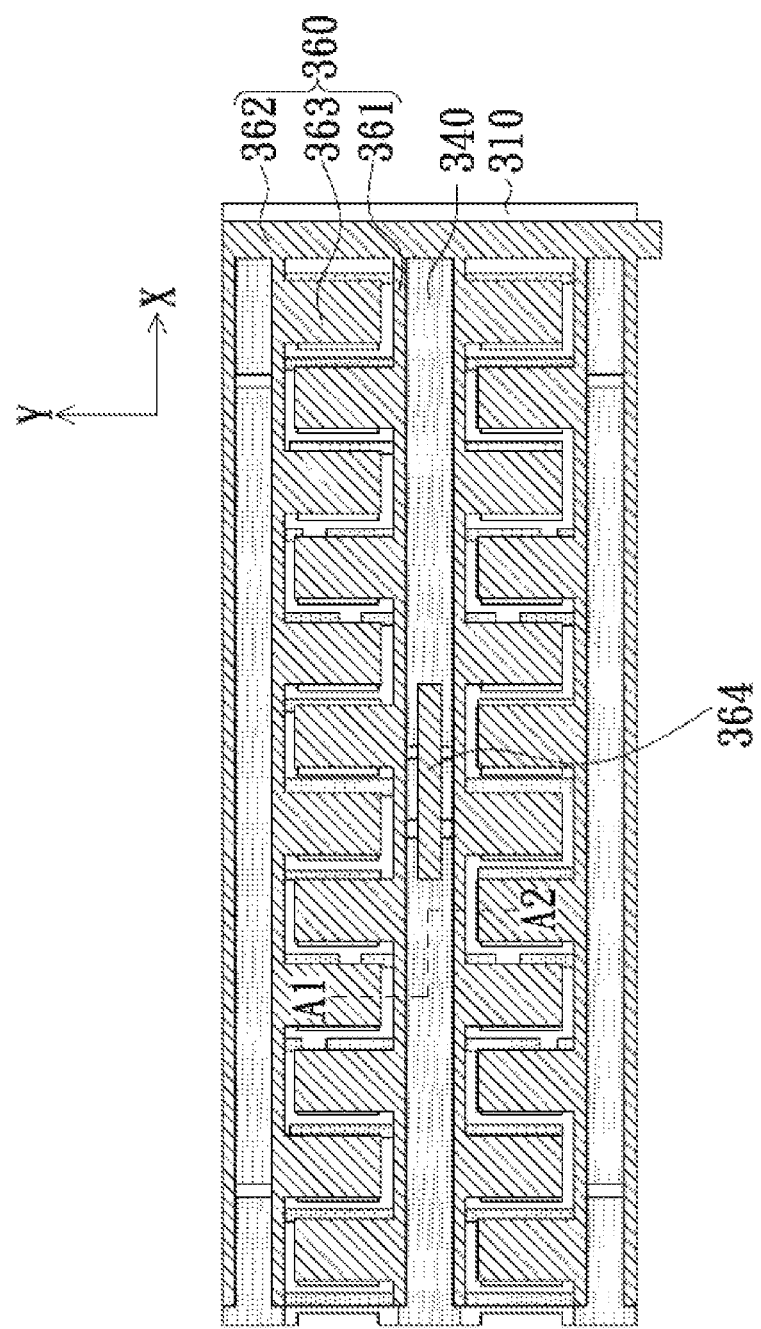
FIG. 4D is a top view of a first substrate of another embodiment of the present disclosure.
Figure 5A:
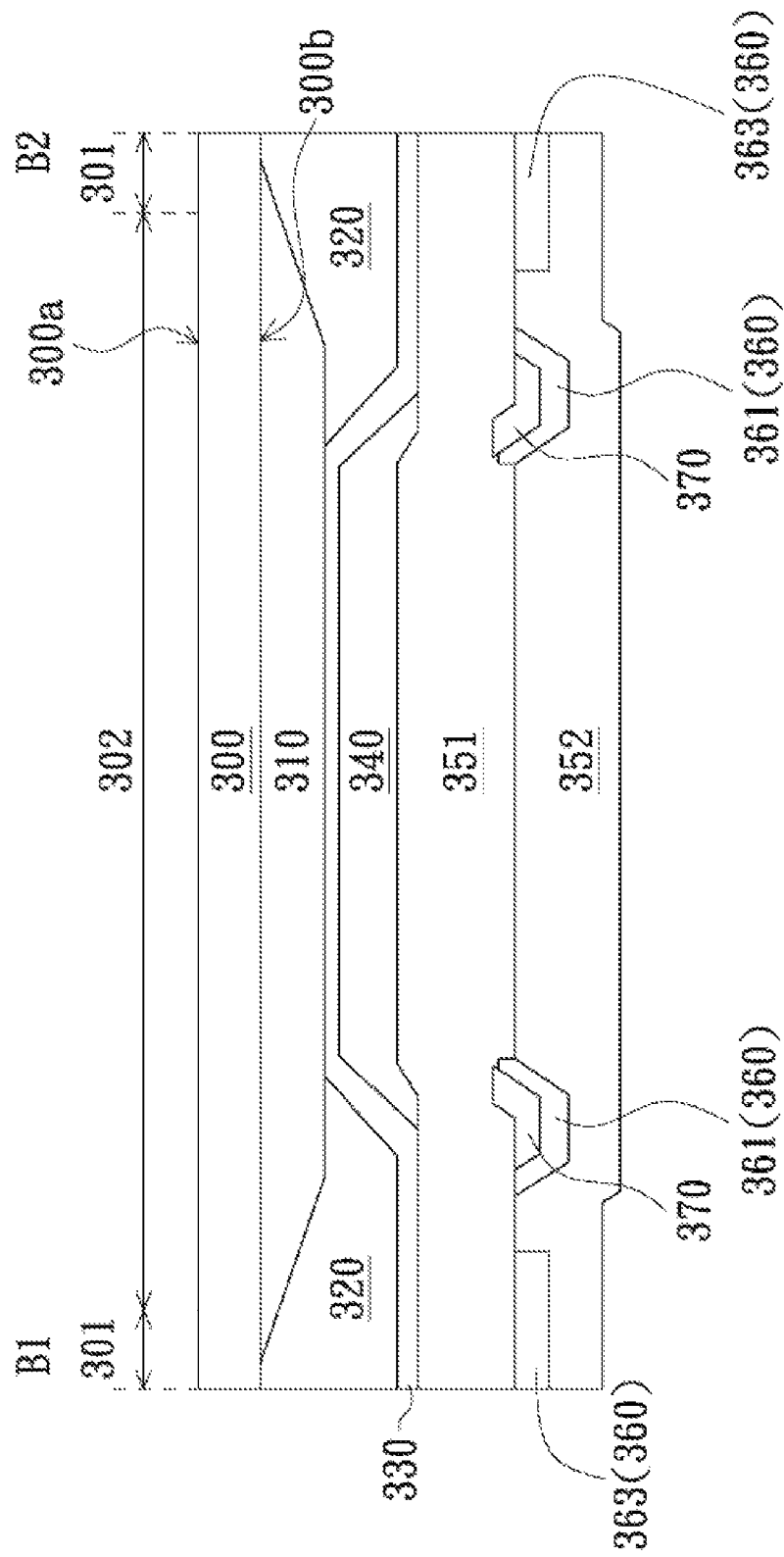
FIG. 5A is a schematic sectional view of the first substrate along a sectional line B1-B2 in FIG. 4D according to another embodiment of the present disclosure.

FIG. 4A is a top view of a black matrix layer according to another embodiment of the present disclosure. FIG. 4B is a top view of a touch electrode layer disposed on the black matrix layer according to another embodiment of the present disclosure. FIG. 4C is a top view of a metal layer disposed on the touch electrode layer and the black matrix layer according to an embodiment of the present disclosure. FIG. 4D is a top view of a first substrate according to another embodiment of the present disclosure. FIG. 5A is a schematic sectional view of the first substrate along a sectional line B1-B2 in FIG. 4D according to another embodiment of the present disclosure.

Referring to FIG. 4A-FIG. 4D and FIG. 5A, the first substrate 300 has a first surface 300a and a second surface 300b. A plurality of opening areas 301 and a non-opening area 302 are defined on the second surface 300b of the first substrate 300, and the non-opening area 302 surrounds the plurality of opening areas 301. The black matrix layer 310 is disposed on the second surface 300b of the first substrate 300. The black matrix layer 310 is disposed corresponding to the non-opening area 302 to surround the plurality of opening areas 301. Next, as shown in FIG. 5A, a color filter layer 320 is disposed on the second surface 300b of the first substrate 300 corresponding to the opening areas 301, and is partially located at an edge, adjacent to the opening areas 301, of the black matrix layer 310; however, the present disclosure is not limited thereto. Specifically, the color filter layer 320 in this embodiment may include a red filter layer, a green filter layer, and a blue filter layer (not shown). The red filter layer, the green filter layer, and the blue filter layer are respectively disposed corresponding to the opening areas 301 of the first substrate 300 respectively by using an island type. Edges of the red filter layer, the green filter layer, and the blue filter layer are respectively partially overlapped with edges of the black matrix layer 310. Subsequently, a protection layer 330 is disposed on the black matrix layer 310 and the color filter layer 320. A material of the protection layer 330 may be an organic insulation material, an inorganic insulation material or a combination of the foregoing materials. Further, referring to both FIG. 4B and FIG. 5A, the touch electrode layer 340 is disposed on the protection layer 330 corresponding to the non-opening area 302. A material of the touch electrode layer 340 may be indium tin oxide (ITO), indium zinc oxide (IZO), metal or another suitable transparent conductive material. In this embodiment, the touch electrode layer 340 includes a plurality of first touch electrodes 340a and a plurality of second touch electrodes 340b. The plurality of first touch electrodes 340a may be sensing touch electrodes, and the plurality of second touch electrodes 340b may be driving touch electrodes; alternatively, the plurality of first touch electrodes 340a may be driving touch electrodes, and the plurality of second touch electrodes 340b may be sensing touch electrodes. In addition, this embodiment may also further include disposing another touch conductive layer (not shown) on the touch electrode layer 340; however, the present disclosure is not limited thereto. A person skilled in the art may consider a value of a touch capacitance during design to decide whether to dispose another touch conductive layer. In certain embodiments, the touch electrode layer 340 may be formed of metal covered with ITO or IZO. With the composite structure, the capacitance may be adjusted. Next, as shown in FIG. 5A, a first flat layer 351 is disposed on the touch electrode layer 340 and the protection layer 330. In this embodiment, the color filter layer 320 using an island-type design may save a cost of the color filter layer, and for an uneven thickness of the color filter layer 320, a problem of uneven film thickness may be mitigated by fabricating the touch electrode layer 340 and the first flat layer 351 subsequently. However, the present disclosure is not limited thereto, and a person skilled in the art may adjust, according to a design consideration, a manner of fabricating the color filter layer. Subsequently, referring to both FIG. 4C and FIG. 5A, a metal layer 370 is disposed on the first flat layer 351 corresponding to the non-opening area 302. A material of the metal layer 370 may be molybdenum (Mo), aluminum (Al) or another suitable metal conductive material and a combination thereof. The metal layer 370 has a plurality of metal bridging lines 373, a plurality of first metal lines 371, and a plurality of second metal lines 372. The plurality of first metal lines 371 extends in a first direction X and the plurality of second metal lines 372 extends in a second direction Y, and the second metal lines 372 are electrically connected to the plurality of first metal lines 371. The plurality of first metal lines 371 and the plurality of second metal lines 372 are electrically insulated from the plurality of metal bridging lines 373. The first direction X and the second direction Y are directions intersecting with each other. In this embodiment, the metal bridging lines 373 are correspondingly disposed between any adjacent two of the second touch electrodes 340b in a direction of a vertical projection on the first substrate 300, and any adjacent two of the second touch electrodes 340b are electrically connected through the metal bridging lines 373. A patterned viewing angle control transparent electrode layer 360 is disposed on the metal layer 370 and the first flat layer 351. A material of the patterned viewing angle control transparent electrode layer 360 may be indium tin oxide (ITO), indium zinc oxide (IZO) or another suitable transparent conductive material. Next, referring to both FIG. 4D and FIG. 5A, the patterned viewing angle control transparent electrode layer 360 has a plurality of control electrode members 363, a plurality of first connection electrode members 361, and a plurality of second connection electrode members 362. The plurality of control electrode members 363 is disposed corresponding to the opening areas 301, and the plurality of first connection electrode members 361 is respectively disposed corresponding to the plurality of first metal lines 371 and is electrically connected to the plurality of control electrode members 363. The second connection electrode members 362 are disposed corresponding to the second metal lines 372 and are electrically connected to the plurality of first connection electrode members 361. The patterned viewing angle control transparent electrode layer 360 further includes a plurality of transparent bridging lines 364. The transparent bridging lines 364 are electrically insulated from the control electrode members 363, the first connection electrode members 361, and the second connection electrode members 362. The transparent bridging lines 364 are disposed corresponding to the metal bridging lines 373 in an overlapped manner, and are electrically connected to any adjacent two of the second touch electrodes 340b through the metal bridging lines 373. Finally, referring to FIG. 5A, a second flat layer 352 is disposed on the patterned viewing angle control transparent electrode layer 360 and the first flat layer 351. A thickness of the second flat layer 252 is at least 3 micrometers to keep relatively desirable LC efficiency. In certain embodiments, the position of the metal layer 370 and the patterned viewing angle control transparent electrode layer 360 and the fabrication steps of forming the metal layer 370 and the patterned viewing angle control transparent electrode layer 360 may be exchanged.

For the first substrate 300 in the foregoing embodiment of the present disclosure, in the present disclosure, the touch electrode layer 340 and the patterned viewing angle control transparent electrode layer 360 are both integrated on the first substrate 300, and the metal layer 370 is disposed between the first flat layer 351 and the patterned viewing angle control transparent electrode layer 360, so that impedance of the patterned viewing angle control transparent electrode layer 360 may be reduced; however, the present disclosure is not limited thereto. In this example, the metal bridging lines 373 and the transparent bridging lines 364 are used to transfer a signal between the second touch electrodes 340b, and the control electrode members 363, the first connection electrode members 361, and the second connection electrode members 362 are used to transfer a signal of a common electrode layer 123 of a second substrate 120. The patterned viewing angle control transparent electrode layer 360 of the present disclosure is disposed on the metal layer 370, and also protects the metal layer 370 in a fabrication process from corrosion to avoid an interruption problem.

Figure 5B:
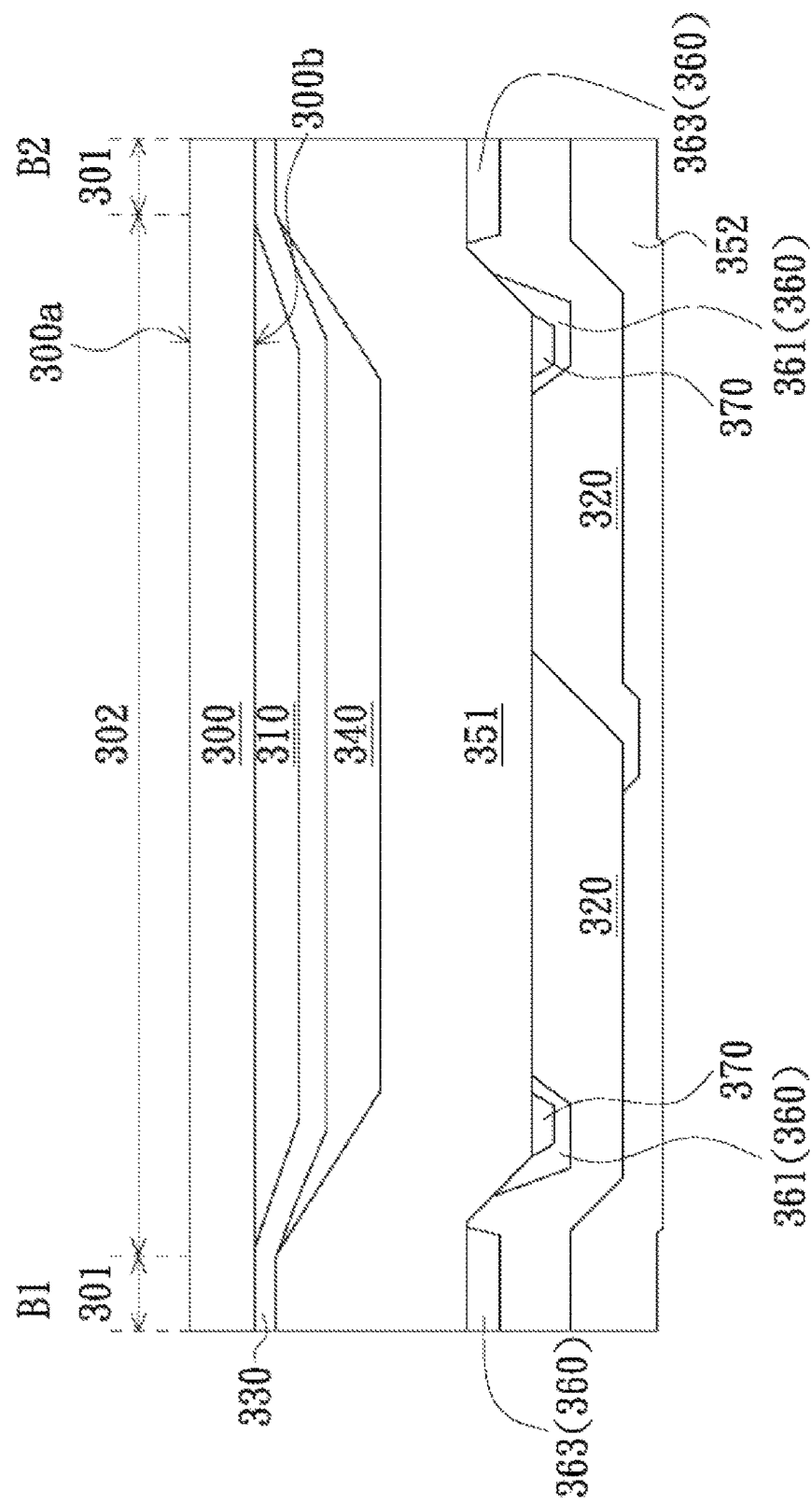
FIG. 5B is a schematic sectional view of the first substrate along a sectional line B1-B2 in FIG. 4D according to another variant embodiment of the present disclosure.

FIG. 5B is a schematic sectional view of the first substrate along a sectional line B1-B2 according to another variant embodiment of the present disclosure. FIG. 5B is another variant embodiment of FIG. 5A, and same element symbols and detailed description are not elaborated herein. Only corresponding differences are described below. As shown in FIG. 5B, the color filter layer 320 is disposed on the patterned viewing angle control transparent electrode layer 360 and the first flat layer 351 corresponding to the opening areas 301 and the non-opening area 302; however, the present disclosure is not limited thereto. Specifically, the color filter layer 320 in this embodiment may include a red filter layer, a green filter layer, and a blue filter layer (not shown). The red filter layer, the green filter layer, and the blue filter layer are respectively disposed by using a strip type respectively in parallel in the first direction X or the second direction Y (referring to FIG. 4D). Edges of the red filter layer, the green filter layer, and the blue filter layer are partially overlapped with each other respectively in a direction of a vertical projection of the black matrix layer 310. Next, the second flat layer 352 is disposed on the color filter layer 320. In this embodiment, a total thickness of the color filter layer 320 and the second flat layer 352 is at least 3 micrometers to keep relatively desirable LC efficiency. In this embodiment, the color filter layer 320 uses a strip design, so that flatness of a film layer may be improved, to prevent that a subsequent thickness of the second flat layer 352 is insufficient to affect flatness of the second flat layer 352. However, the present disclosure is not limited thereto, and a person skilled in the art may adjust, according to a design consideration, a manner of fabricating the color filter layer. In another variant embodiment of the present disclosure, the color filter layer 320 is disposed between the patterned viewing angle control transparent electrode layer 360 and the second flat layer 352, so as to reduce the thickness of the second flat layer 352 to reduce vapor infiltration to avoid formation of LC bubbles.

In conclusion, for the touch display apparatus proposed in the present disclosure, a patterned viewing angle control transparent electrode layer is used to implement efficacy of anti-peeping. A voltage difference between the patterned viewing angle control transparent electrode layer and a common electrode layer is adjusted to control LC rotation in an LC layer to reduce a viewing angle of the touch display apparatus, so that irrelevant people around a user are prevented from peeping at personal information on a screen. In addition to the efficacy of anti-peeping, the patterned viewing angle control transparent electrode layer may also be used as a bridge between touch electrodes on the touch electrode layer, so as to replace an original metal layer used as a bridge, thereby reducing complexity of processing.

Although the present disclosure is disclosed as above by using the preferred embodiments, the preferred embodiments are not used to limit the present disclosure. Any person skilled in the art may make variations and modifications without departing from the spirit and scope of the present disclosure, and therefore the protection scope of the present disclosure should be as defined by the appended claims.

What is claimed is:

1. A touch display apparatus, comprising:
a first substrate, having a first surface and a second surface, wherein a plurality of opening areas and a non-opening area are defined on the second surface, and the non-opening area is defined as surrounding the opening areas, the first substrate comprising:
a black matrix layer, disposed on the second surface of the first substrate and corresponding to the non-opening area;
a color filter layer, disposed on the second surface of the first substrate;
a protection layer, covering the black matrix layer and the second surface of the first substrate;
a touch electrode layer, disposed at least on the protection layer and corresponding to the non-opening area;
a first flat layer, covering the protection layer and the touch electrode layer, wherein the touch electrode layer is disposed between the protection layer and the first flat layer;
a patterned viewing angle control transparent electrode layer, disposed on the first flat layer, the patterned viewing angle control transparent electrode layer having a plurality of control electrode members, a plurality of first connection electrode members, a plurality of second connection electrode members, and a plurality of transparent bridging lines, wherein the control electrode members are disposed corresponding to the opening areas, the first connection electrode members are disposed corresponding to the non-opening area and extending in a first direction and are electrically connected to the control electrode members, the second connection electrode members are disposed corresponding to the non-opening area and extending in a second direction and are electrically connected to the first connection electrode members, and the transparent bridging lines are disposed between any adjacent two of the first connection electrode members and are electrically connected to the touch electrode layer; and
a second flat layer, disposed on the patterned viewing angle control transparent electrode layer;
a second substrate, disposed opposite to the second surface of the first substrate, wherein the second substrate has a side facing to the second surface of the first substrate, and comprises a pixel electrode layer, an insulator layer, and a common electrode layer that are disposed on the side, and the insulator layer is disposed between the pixel electrode layer and the common electrode layer; and
a liquid crystal (LC) layer, disposed between the second flat layer of the first substrate and the second substrate.

2. The touch display apparatus according to claim 1, wherein the color filter layer is disposed between the black matrix and the protection layer.

3. The touch display apparatus according to claim 1, wherein the color filter layer is disposed between the patterned viewing angle control transparent electrode layer and the second flat layer.

4. The touch display apparatus according to claim 1, wherein the first direction and the second direction are set intersecting with each other.

5. The touch display apparatus according to claim 1, wherein the touch electrode layer comprises indium tin oxide (ITO), indium zinc oxide (IZO), metal or combinations thereof.

6. The touch display apparatus according to claim 1, further comprising a metal layer, disposed between the first flat layer and the patterned viewing angle control transparent electrode layer and corresponding to the non-opening area, wherein the metal layer has a plurality of metal bridging lines, a plurality of first metal lines, and a plurality of second metal lines, the metal bridging lines are disposed corresponding to the transparent bridging lines in an overlapped manner and are electrically connected to the touch electrode layer, the first metal lines extend in the first direction, the second metal lines extend in the second direction, and the first metal lines and the second metal lines are electrically insulated from the touch electrode layer.

7. The touch display apparatus according to claim 6, wherein the first metal lines are disposed corresponding to the first connection electrode members in an overlapped manner, and the second metal lines are disposed corresponding to the second connection electrode members in an overlapped manner.

8. The touch display apparatus according to claim 6, wherein the transparent bridging lines are electrically connected to the touch electrode layer through the metal bridging lines.

9. The touch display apparatus according to claim 1, wherein the transparent bridging lines are used to transfer a touch signal, and the control electrode members, the first connection electrode members, and the second connection electrode members are used to transfer a common electrode layer signal.

10. The touch display apparatus according to claim 1, wherein the common electrode layer is used to receive a first voltage, the patterned viewing angle control transparent electrode layer is used to receive a second voltage, and a voltage difference is generated between the first voltage and the second voltage.

* * * * *